US006971423B2

(12) United States Patent
Starr (10) Patent No.: US 6,971,423 B2
(45) Date of Patent: Dec. 6, 2005

(54) METHOD AND APPARATUS FOR SINGULATING, DEBARKING, SCANNING AND AUTOMATICALLY SAWING AND SORTING LOGS INTO LENGTHS

(75) Inventor: Donald Starr, Merritt (CA)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 10/268,889

(22) Filed: Oct. 11, 2002

(65) Prior Publication Data

US 2003/0029519 A1 Feb. 13, 2003

Related U.S. Application Data

(62) Division of application No. 09/712,295, filed on Nov. 15, 2000, now Pat. No. 6,539,993.

(51) Int. Cl.[7] .............................. B27L 1/00; B27B 1/00; B23Q 15/00; B23Q 16/00
(52) U.S. Cl. ..................... 144/340; 144/3.1; 144/208.1; 144/357; 144/267; 144/382; 144/398; 144/242.1; 83/368; 83/371
(58) Field of Search .......................... 144/208.1, 208.4, 144/208.5, 208.9, 335, 338, 340, 343, 382, 144/404, 376, 379, 367, 341, 398; 83/368, 83/371; 209/517, 521; 198/463.5, 743; 414/745.9

(56) References Cited

U.S. PATENT DOCUMENTS

| | | | |
|---|---|---|---|
| 3,459,246 A | * | 8/1969 | Ottosson |
| 3,806,253 A | * | 4/1974 | Denton ........................ 250/219 |
| 4,069,851 A | * | 1/1978 | Bibler ......................... 144/357 |
| 4,185,672 A | * | 1/1980 | Vit et al. ...................... 144/3.1 |
| 4,330,019 A | | 5/1982 | Murphy et al. |
| 4,468,993 A | * | 9/1984 | McCown et al. .............. 83/112 |
| 4,609,020 A | | 9/1986 | Hutson |
| 4,640,160 A | * | 2/1987 | Hards .......................... 83/75.5 |
| 4,907,294 A | * | 3/1990 | Bolton et al. ................ 144/357 |
| 4,930,616 A | * | 6/1990 | Lindberg .................. 198/463.6 |
| 5,117,881 A | | 6/1992 | Simpson |
| 5,119,930 A | | 6/1992 | Stelter |
| 5,544,757 A | * | 8/1996 | Geiger et al. ................ 209/518 |

(Continued)

Primary Examiner—Derris H. Banks
Assistant Examiner—Shelley Self (57) ABSTRACT

A log handling and cutting system which cuts logs into lengths, and allows for maximum use of fiber. The system includes equipment for singulating the logs, optimally removing the bark from the logs, scanning the true log image, cutting the logs to length, and sorting the cut logs arranged in a sequence of coupled operations. The logs are singulated using a dual quadrant singulation system to provide maximum singulation reliability, thereby allowing a single operator to attend to this process. Once singulated, the logs are fed automatically into a debarker where the diameter and volume are scanned and debarker-operating parameters are set for optimum bark removal. The log is then scanned, tree length, using a unique scanning system, which determines the true image of the log. This enables the determination by computer of the optimum bucking solution of the log as well as a proper sorting of the optimum random lengths. The saws are adjusted in response to the computer solution and the log is positioned by a positioner according to a computer generated reference datum. This results in the log being positioned for cutting to the optimum random lengths. A command signal is sent from the computer to the log sorting system, which tracks the position of the random lengths and allows them to be sorted to the appropriate sort storage bin.

5 Claims, 8 Drawing Sheets

U.S. PATENT DOCUMENTS

| | | | |
|---|---|---|---|
| 5,579,671 A | * | 12/1996 | Bowlin ........................ 83/75.5 |
| 5,622,213 A | * | 4/1997 | McKelvie ................ 144/246.2 |
| 5,722,475 A | | 3/1998 | Lammi |
| 6,279,441 B1 | * | 8/2001 | Streblow ..................... 83/75.5 |
| 6,305,259 B1 | * | 10/2001 | Whitworth et al. ............ 83/23 |
| 6,539,993 B1 | * | 4/2003 | Starr .......................... 144/340 |

* cited by examiner

METHOD AND APPARATUS FOR SINGULATING, DEBARKING, SCANNING AND AUTOMATICALLY SAWING AND SORTING LOGS INTO LENGTHS

CROSS-REFERENCE TO RELATED APPLICATION

This application is a divisional of U.S. patent application Ser. No. 09/712,295, filed 15 Nov. 2000, now U.S. Pat. No. 6,539,993 the disclosure of which is incorporated herein by reference.

FIELD OF THE INVENTION

This invention relates to a method and apparatus for singulating, debarking, scanning and automatically sawing and sorting logs into lengths. More particularly, this invention relates to a high product system and apparatus for processing raw logs into debarked optimum lengths for sawing into the maximum amount of lumber per log.

BACKGROUND OF THE INVENTION

For raw logs to be cost effectively processed into random lengths without bark for use in a sawmill, it is important that this process is done with speed, accurate information obtained about the log, and accurate cutting into the maximum number of usable lumber per log. The speed requirement is determined in part by the efficient singulation of the logs from a log pile into the log processing system, in part by the rate at which bark can be removed optimally, with a minimum amount of white waste, in part by the rate at which the log can be quickly and accurately positioned and cut by the saws and in part by the rapid effective removal system of the random lengths. The accuracy of the information obtained about a log is determined by the type of conveying system, the type of scanner and whether the log is scanned with bark on or bark off. The accuracy of cutting the logs into lengths is determined in part by the required log process speed and in part by the system and equipment in which the log is positioned relative to the saw.

Considerable effort has been expended over the years to develop efficient and high speed log processing systems. The prior art that has been developed includes equipment and systems disclosed in the U.S. patents listed below.

U.S. Pat. No. 5,119,930, granted Jun. 9, 1992, Stelter, discloses and protects a single quadrant-type log sorter. Stelter, in FIGS. 1 and 2, illustrates in dotted lines, a counterweight 70 which reduces the force necessary to raise the quadrant 16. Stelter also discusses at column 4, lines 53–56, the use of a double-acting cylinder 56 so pressure may be provided on both sides of a piston to raise and lower the quadrant and rectify a portion of the live load. Stelter does not, however, disclose dual quadrants.

U.S. Pat. No. 5,722,475, granted Mar. 3, 1998, Lammi, discloses a design of ring type debarker using rotary cutting heads 23. The ring or rotor 4 can be varied in speed, as stated in the abstract, and in column 2, lines 60–63. The speed of the rotor disk 4 can be adjusted continuously due to variations in log diameter, surface finish, irregularities and the like. It is mentioned in column 2, lines 64–67, that the rotational speed of the cutting head should be kept nearly constant regardless of variations in the rotor speed. Lammi therefore does not disclose variable ring or rotor speed or variable force on the cutting blades.

U.S. Pat. No. 4,609,020, granted Sep. 2, 1986, Hutson, is one of several Hutson patents which disclose a log debarker system which has a rotor assembly 26 which uses a plurality of debarking tools 28 (knives), the combination rotating in a rotor housing assembly 24. There is no mention of varying the force on the debarking tools 28 or rotor or log feed speed as a function of diameter.

U.S. Pat. No. 5,117,881, granted Jun. 2, 1992, Simpson, assigned to Nicholson Manufacturing Company, discloses a ring type debarking apparatus which includes counterbalance weights 64 for rotary cutters 22. The counterbalance weights 64 offset centrifugal and gravitational forces. The debarker also includes rotary cutting units 18 on ends of swing arms 24. The debarker ring 22 rotates (see column 2, lines 8–9) but presumably at a constant speed. There is no mention of varying ring speed, tool tip force or log feed speed as a function of log diameter.

U.S. Pat. No. 4,330,019, granted May 18, 1982, Murphy et al., discloses a sawmill for cutting logs into lengths which allows for maximum use of the wood. An electronic scanner surveys the log as it is delivered to a support and obtains log profile data which is transmitted to a computer. Signals sent by the computer to each of the saws cause the saws to take up positions which ensure that the log is cut into optimum random lengths. The Murphy et al. system utilizes a reference datum line or cutting plane (see column 1, lines 55–56) for positioning the log. Murphy et al. disclose a "reach out" cylinder 126 and an end plate, but these are used to assess the position of the butt end of the log and do not push the log into any particular position. The log therefore remains in its initial rest position. Murphy et al. also disclose a scanner 100 which may use conventional single or double axis techniques for scanning (see column 4, lines 28–29) as well as a master control unit 110.

U.S. Pat. No. 4,468,993, granted Sep. 4, 1984, McCown et al., discloses a log bucking station in which a log is scanned to determine its size and shape. The scan data is analyzed by a computer which determines the optimum locations for cuts on the log. The proposed cut locations are optically displayed on the log by a laser for inspection by the operator. The operator can overrule the computer. McCown et al. permit the distance between the pairs of saws to be varied because the saws run on tracks. By varying the distance between the two travelling saws 26 and 28, it is said that it is possible to optimize the saw cut locations.

SUMMARY OF INVENTION

The present invention overcomes or greatly reduces the disadvantages of known systems for processing raw logs into debarked random cut lengths prior to delivery of the logs to a chipping or log sawing apparatus.

The invention is directed to a log processing and cutting system comprising: (a) a log infeed deck; (b) a log feeder; (c) a dual quadrant singulator located downstream of the log feeder; (d) an infeed conveyor; (e) a log barker located downstream of the barker infeed conveyor; (f) a barker outfeed conveyor located downstream of the log debarker; (g) a bucking line scanner which scans the debarked log and by means of an associated computer, determines the log profile of the debarked log and determines optimum cutting locations on the log; (h) a conveyor located downstream of the bucking line scanner for conveying the scanned log to a bucking line; (i) a cradle in which the scanned log is held; (j) a bucking line positioner which contacts an end of the scanned log and moves it to an optimum position for cutting by a cut-off saw; (k) a bucking line cut-off saw which cuts the log at the optimum location determined by the computer from the log profile information ascertained by the scanner; (l) a bucking line outfeed conveyor located downstream of the cut-off saw for conveying away the cut log; and (m) a log sorter which directs the cut log to a log sorting station.

The dual quadrant singulator can comprise a lower quadrant singulator and an upper quadrant singulator, the pair of singulators operating in combination to single out and elevate individual logs.

The debarker can incorporate rotating rings, which can hold debarking knives and the force exerted on the cutting knives and the speed of rotation of the rings can be varied according to log profile characteristics of an individual log. The bucking line scanner can determine the log profile by three laser scans, to determine the volume and shape of the log being scanned at incremental log lengths.

The computer can instruct the cut-off saw to move in advance of the log reaching the cradle in order to minimize saw travel during the log cutting operation. The log positioner can comprise a hydraulic piston and cylinder, the piston extending a specified distance as determined by the computer, based on log profile and volume data as determined by the log scanner, and thereby positioning the log in optimum position.

The system can include a pair of spaced apart cut-off saws, the locations of the pair of cut-off saws being variable according to optimum saw location cut points on the log to be cut, as determined by the computer based on log scan data determined by the scanner.

The invention is also directed to a method of processing and cutting logs comprising: (a) singulating logs using a dual quadrant singulator; (b) debarking the logs using a variable speed ring and knife system; (c) scanning the debarked log by means of an associated computer, which determines the log profile of the debarked log and determines optimum cutting locations on the log; (d) conveying the scanned log to a bucking line cradle; (e) using a bucking line positioner which contacts an end of the scanned log and moves it to an optimum position for cutting; (f) cutting the log at the optimum locations as determined by the computer from the log profile information ascertained by the scanner and according to the positioner; (g) conveying the cut log away from the cutting area; and (h) sorting the cut log according to a command from the computer.

The dual quadrant singulator can comprise a lower quadrant singulator which can lift the log to a first elevation and an upper quadrant singulator, which can lift the log to a second elevation. The rotating rings of the debarker can hold cutting knives and the force exerted by the cutting knives on the log and the speed of rotation of the rings can be varied according to log profile characteristics of an individual log.

The scanning of the log can be done by three laser scans, which determine the volume and shape of the log being scanned at incremental log lengths. A computer can command a saw to move in advance of the log reaching the cradle to thereby minimize saw travel during the log cutting operation. The log can be positioned in the cradle by a piston which can extend a specified distance as determined by the computer, based on log profile and volume data as determined by the log scanner, and thereby positioning the log in optimum position. The log can be cut at two locations, the locations of the cuts being determined as optimum by the computer based on log scan data ascertained by the scanner.

BRIEF DESCRIPTION OF DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE LOG PROCESSING MILL

A log handling and cutting system which cuts logs into lengths, and allows for maximum use of fiber is disclosed. The system includes equipment for singulating the logs, optimally removing the bark from the logs, scanning the true log image, cutting the logs to length, and sorting the cut logs arranged in a sequence of coupled operations. The logs are singulated using a dual quadrant singulation system to provide maximum singulation reliability, thereby allowing a single operator to attend to this process. Once singulated, the logs are fed automatically into a debarker where the diameter and volume are scanned and debarker-operating parameters are set for optimum bark removal. The log is then scanned, tree length, using a unique scanning system, which determines the true image of the log. This enables the determination by computer of the optimum bucking solution of the log as well as a proper sorting of the optimum random lengths. The saws are adjusted in response to the computer solution and the log is positioned by a positioner according to a computer generated reference datum. This results in the log being positioned for cutting to the optimum random lengths. A command signal is sent from the computer to the log sorting system, which tracks the position of the random lengths and allows them to be sorted to the appropriate sort storage bin.

This subject invention optimizes the debarking of the logs by using input variables of log diameter, tool overlap, tool speed (SFPM—surface feet per minute), and required tool tip force to determine the debarker feedspeed, debarker ring RPM and the applied pressure to the debarker tools (PSI). The applied pressure calculation takes into account the effects of centripetal acceleration on the tool arms at a given log diameter to ensure that the correct and optimum pressure is applied to debarking tools.

In the system according to the invention, the logs are first singulated from a log pile using a dual quadrant feed arrangement which enables high log handling rates with minimal intervention by an attendant. Once singulated, the log is fed automatically in a variable speed ring style debarker where log diameter information is collected and the debarking procedure is optimized for tool overlap, feed-speed, ring RPM, and tool pressure. This combination minimizes cutting overlap and wasted white wood. This debarking process is adjusted dynamically by a computer as the log diameter is changed down the log length (since logs are not perfect cylinders). After debarking, the log is scanned over its entire tree length on a belt with a triple combination scanner. This scanner system calculates the log length, log volume and the true shape cross-section of the log down its length thereby generating a true shape image of the log. This data includes sweep, taper, crooks and other log imperfections. This data is then transmitted to an optimizing computer, which rapidly analyzes the data and determines the optimum cut locations. The debarked and scanned log is then transferred transversely to a queuing cradle and then into a cut cradle. As soon as the log reaches the cut cradle, a unique log positioner locates the end of the log in relation to the moveable saw positions and pushes the log into optimum position for cutting. Once the log is cut, the cut portions are taken away and the saws are able to move to their next required position, while a new log is being transferred to the cut cradle. The log that has been cut into sections is unloaded onto a conveyor belt and is transferred to the cut piece sorting area. While this transfer is being performed, the new log is being cut. This overlap of infeed, cutting and outfeed cycles reduces log handling time and allows a smooth and efficient process to be performed in the log cut-off saw area of the system.

Figure 1:
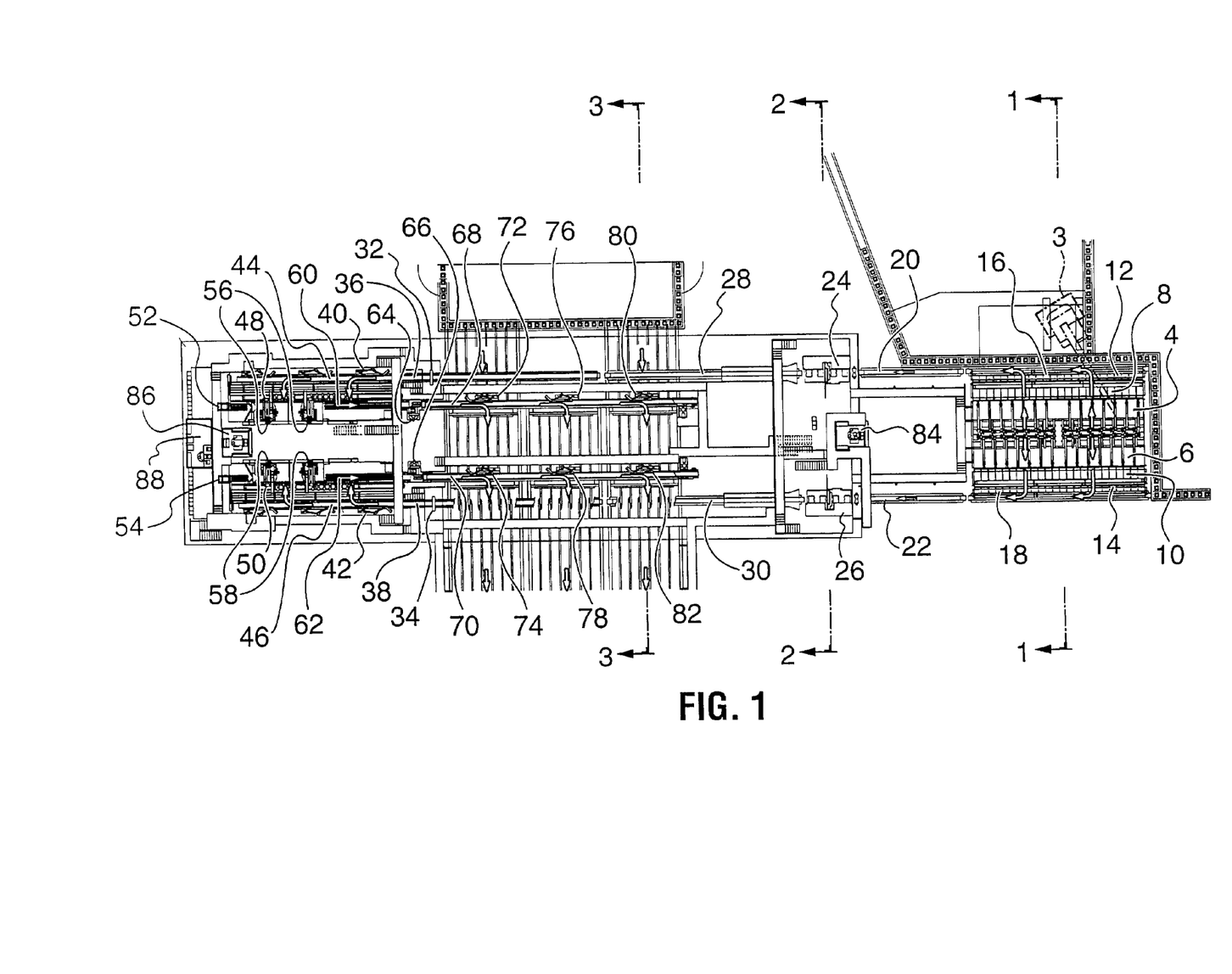
FIG. 1 is a schematic plan of the log processing mill showing the general arrangement and sequence of the log processing equipment and process.

Referring to the drawings, FIG. 1 illustrates a schematic plan of the overall log processing system and equipment including the general arrangement and sequence of the log processing equipment from the raw log collection area to the finished debarked and cut log area. FIG. 1 illustrates a parallel log processing line whereby two trains of raw logs can be debarked and cut simultaneously. It will be understood that only one log train can be used or that further parallel log processing lines can be added.

As seen in schematic plan in FIG. 1, the overall dual parallel log sorting, singulating, debarking and log cutting trains are illustrated generally by reference numeral 2. The first barker infeed deck 4 and the second corresponding barker infeed deck 6 provide locations where the raw log grappler 3 can lift raw logs from a log pile which is supplied by trucks hauling raw logs from the timber stand, and dumping the logs on the decks 4 and 6.

The first quadrant barker feeder 8 and the second quadrant barker feeder 10 feed raw logs from the corresponding first and second barker infeed decks 4 and 6 to corresponding first dual quadrant singulator 12 and second dual quadrant singulator 14. The first and second stream of raw logs singulated by the first and second dual quadrant singulators 18 and 14 are dropped onto corresponding first barker infeed conveyor 16 (first section) and second barker infeed conveyor 18 (first section). Once the raw logs reach the ends of the first and second conveyors 16 and 18, they are conveyed further by the corresponding first barker infeed conveyor 20 (second section) and second barker infeed conveyor 22 (second section). The conveyors 20 and 22 then feed the respective streams of raw logs to the first debarker 24 and the second debarker 26. The first and second debarkers 24 and 26 are unique and have automatic variable ring speed, variable cutting tool pressure, log diameter adjustment capability and variable log speed handling capability. This minimizes bark cutting overlap (which is wasteful and time consuming because the rotating blades retrace debarked area) and depth of cut white wood (which is wasted).

After the first and second raw logs have been optimally debarked, they are conveyed away from the first and second barkers 24, 26 by first barker outfeed conveyor 28 and second barker outfeed conveyor 30. The barked first and second logs are then passed respectively through a first bucking line scanner 32 and a second bucking line scanner 34, where the log profiles of the debarked logs are profiled by a triple log scanning system, which transmits the scan data to a computer. The triple scanners, in a preferred embodiment, are laser scanners and continuously determine the log diameter, the log profile including curves, crooks, taper, and sweep, as well as volume. The computer is then able from this data to determine optimum saw cut locations so as to maximize the amount of useful timber that can be cut from each log.

Once the first and second logs have been scanned, and the scan data transmitted to and analyzed by the computer, they are conveyed respectively by first bucking line conveyor 36 and second bucking line conveyor 38. At that point, the first and second barked and scanned logs are swept to the first bucking line and the second bucking line respectively by first sweep 40 and second sweep 42. The first and second logs then are handled by first bucking line stop-loader and second bucking line stop-loader 44 and 46 respectively. The logs are then dropped onto first bucking line cradle 48 and second bucking line cradle 50 respectively.

The first scanned and barked log lying in the first bucking line cradle 48 and the second scanned and barked log lying in the second bucking line cradle 50 are then, as determined by the computer scan, according to optimum saw cut points, positioned by first bucking line positioner 52 and second bucking line positioner 54. In other words, the butt ends of the respective pair of logs are contacted respectively by the first positioner 52 and second positioner 54 and moved by the positioners to the optimum locations on the first and second cradles 48 and 50 for cutting by the two pairs of saw. This feature of the two log bucking areas is unique and is highly efficient. Once the first and second logs are optimally positioned respectively by the first bucking line positioner 52 and the second bucking line positioner 54, they are respectively cut by the first pair of bucking line saws 56 and the second pair of bucking line saws 58. FIG. 1 shows a pair of cut-off saws 56 and 58 in both the first and second log handling lines, but only one saw in each line can be used, or additional saws can be added. One saw may be all that is required for short logs. Long logs may require three or more logs.

Once the first and second logs have been cut into respective segments by the first and second bucking saws 56 and 58, the logs are conveyed away from the bucking saws 56 and 58 by respective first bucking line outfeed conveyor 60 and second bucking line outfeed conveyor 62. The velocity of travel of the first and second logs is accelerated respectively by first bucking line log accelerator 64 and second bucking line log accelerator 66. The propelled logs then reach respectively the first bucking line log sort conveyor 68 and the second bucking line log sort conveyor 70. Subsequently, the first and second logs are swept laterally by first bucking line sweep No. 1 and log catcher 72, and second bucking line sweep No. 1 and log catcher 74.

As shown in FIG. 1, the log bucking area is set up with a pair of cut-off saws in each of the parallel log bucking lines, which thereby cuts the scanned logs into three separate components. A command signal is sent from the computer to the log sorting system, which tracks the position of the random log lengths and enables them to be sorted to the appropriate sort storage bin.

The log components, according to the length of each cut segment, are sorted by first bucking line sweep No. 76 and second bucking line sweep No. 78 and first bucking line sweep No. 3 and second bucking line sweep No. 80, 82, as determined by the computer and according to the length of the segments that have been cut for each cut log.

FIG. 1 also shows the location of the barking area operator cab 84 and the bucking area operator cab 86. An operator sitting in the first cab 84 can conveniently view the log deck and singulating area and intervene when something goes amiss in the raw log handling area, such as two logs being dropped on a conveyor belt, or a log ends up crossways. An operator sitting in the cab 86 can conveniently view the bucking area and intervene if a hitch of some sort develops in the bucking area. The computer is housed in computer room 88. The log sorting barking and bucking system according to the invention can be operated quickly and efficiently by only two operators, whereas previously nine or more personnel were required to handle the same volume of logs for processing, barking and cutting.

Figure 2:
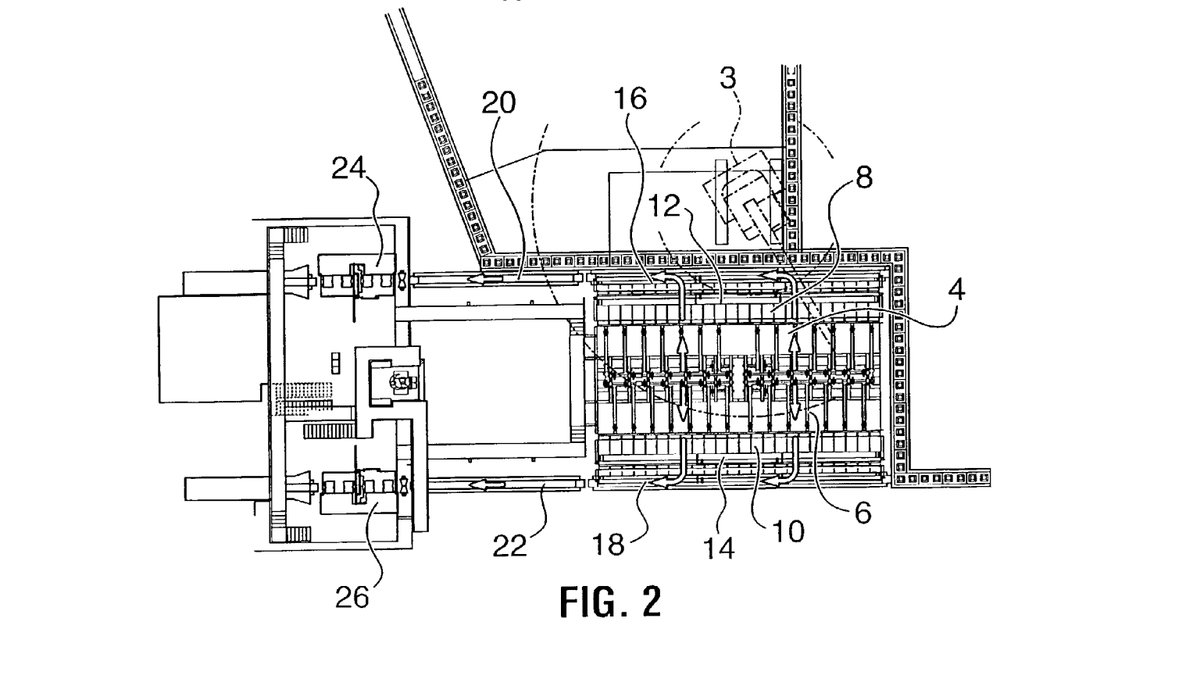
FIG. 2 is a detail schematic plan of the quadrant/barker area showing the general arrangement of the log singulating and debarking equipment.

FIG. 2 illustrates a detailed enlarged schematic plan of the quadrant/barker area including the general arrangement of the raw log processing equipment. The raw log grappler 3 loads raw logs from a truck supplied log pile onto the first barker infeed deck 4 and the second barker infeed deck 6 respectively. From there, the respective first and second logs are moved to first quadrant barker feeder 8 and second quadrant barker feeder 10, as indicated by the arrows. The first and second logs are then singulated by the first dual quadrant singulator 12 and the second dual quadrant singulator 14 respectively.

The first and second singulated logs are then conveyed to the respective barkers 24 and 26 by the first barker infeed conveyor 16 and the second barker infeed conveyor 18 respectively. Reference numerals 16 and 18 denote the first sections of the respective log conveyors 16 and 18. The first and second singulated logs are then conveyed from the first section of the first and second infeed conveyors 16 and 18 to the second sections of first barker infeed conveyor 20 and the second section of barker infeed conveyor 22. First and second section conveyors are advantageous because they circumvent the need to have long break-down prone conveyors.

The first and second logs are then fed respectively to the first debarker 24 and the second debarker 26. The first debarker 24 and the second debarker 26 are of unique construction because they utilize variable ring speed, rather than constant ring speed, variable bark removing knife pressures, and variable log diameter handling capability in order to achieve maximum debarking efficiency and minimum white wood cuttings. The foregoing variables also minimize bark cutting overlap, thereby resulting in improved efficiency.

Figure 3:
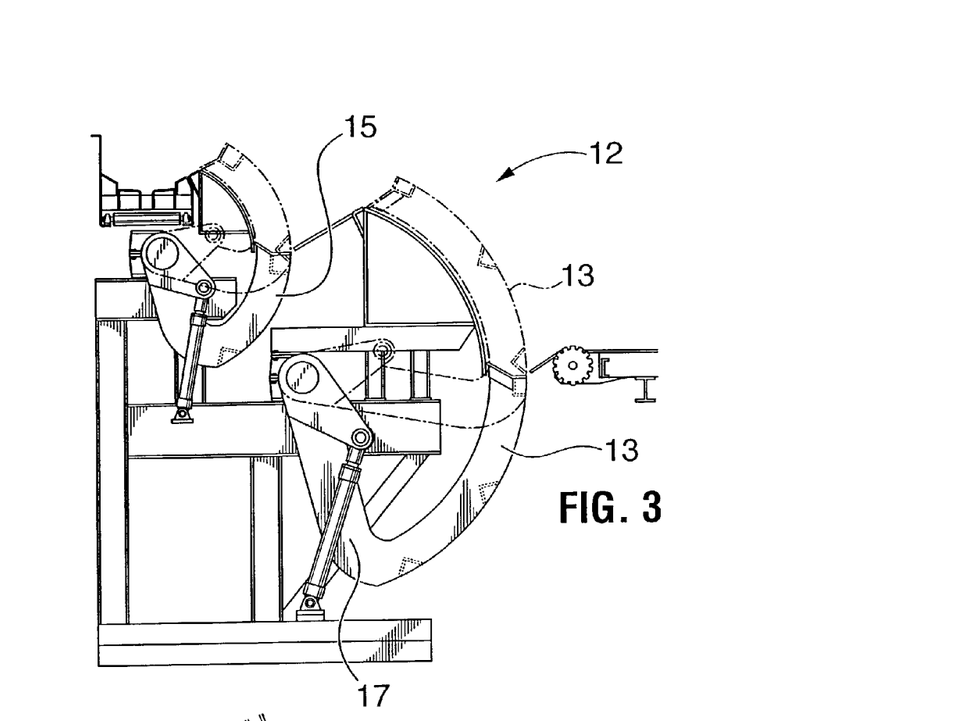
FIG. 3 is an end elevation of the dual log quadrant feeder.

FIG. 3 illustrates an end elevation of a dual log quadrant feeder 12 (also known as a singulator). As can be seen in FIG. 3, the dual quadrant singulator 12 is constructed of a lower large diameter quadrant feeder 13 and a smaller diameter upper quadrant feeder 15. Lower quadrant feeder 13 has a counterbalance weight 17, while upper quadrant feeder 15 has a similar balance weight. These weights reduce the force required to lift the respective quadrant. The combination of lower and upper quadrant feeders has been found to be very advantageous in ensuring proper singulation of the raw logs which can have many imperfections such as broken branch stumps, crooks, twists, sweeps, and the like, thus increasing the difficulty of singulating the logs on a reliable and trouble-free basis. The dual feeders 13 and 15 increase the likelihood that the logs are properly singulated before they are dumped onto the barker infeed conveyor 16. This results in minimized down time due to the dual quadrants inadvertently picking up two or more logs, or no logs at all.

Figure 4:
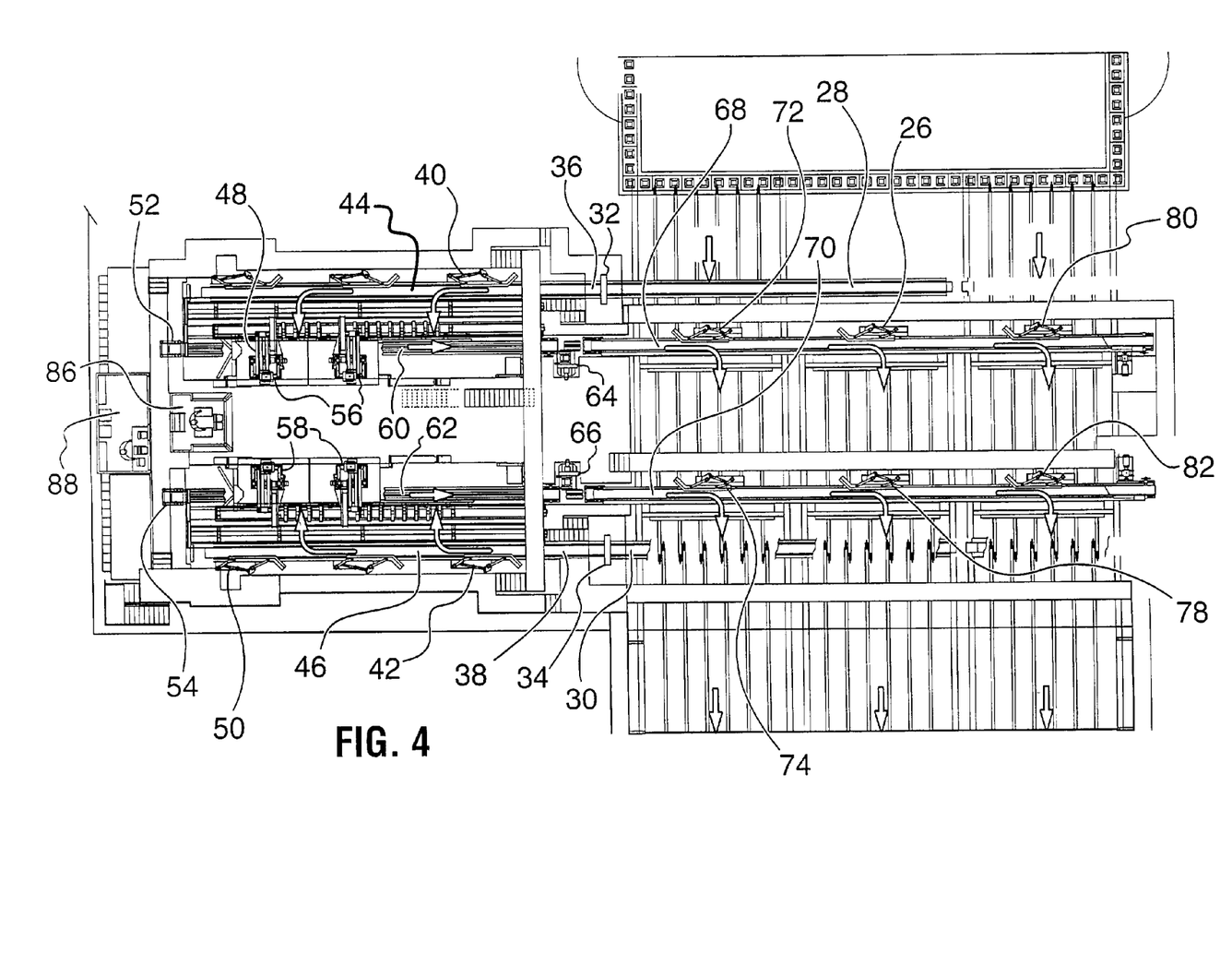
FIG. 4 is a schematic plan of the cut-off-saw bucking area showing the general arrangement of the log handling, sawing and cut log conveying and sorting equipment.

FIG. 4 illustrates an enlarged detailed schematic plan of the cut-off saw area showing the general arrangement of the log sawing and handling equipment. After the first and second lines of raw logs have been debarked, they are conveyed away from the first and second barkers by first barker outfeed conveyor 28 and second barker outfeed conveyor 30. The barked first and second logs are then passed respectively through a first bucking line scanner 32 and a second bucking line scanner 34, where the log profiles of the debarked logs are profiled by a triple log scanning system, and accessed by the computer.

Once the first and second logs have been scanned, they are conveyed respectively by first bucking line conveyor 36 and second bucking line conveyor 38. The first and second barked and scanned logs are then swept to the first bucking line and the second bucking line respectively by first sweep 40 and second sweep 42. At that point, the first and second logs are handled by first bucking line stop-loader and second bucking line stop-loader 44 and 46 respectively. The logs are then dropped onto first bucking line cradle 48 and second bucking line cradle 50 respectively.

The first scanned and barked log lying in the first bucking line cradle 48 and the second scanned and barked log lying in the second bucking line cradle 50 are then, as determined by the computer scan, are respectively positioned by the first bucking line positioner 50 and the second bucking line positioner 54 to move them to optimum saw cut positions. This feature of the log bucking areas is unique and highly efficient. Once the first and second logs are located respectively by the first bucking line positioner 52 and the second bucking line positioner 54, in the optimum positions, they are respectively cut by the first bucking line saw 56 and the second bucking line saw 58. As shown in FIG. 4, there are a pair of cut-off saws 56 and 58 in both the first and second log handling lines. The pairs of cut-off saws 56 and 58 are mounted on rollers and tracks so the distances between the pairs of saws in the respective cut saws 56 and 58 can be varied. The positions are controlled by the computer.

Once the first and second logs have been cut into respective segments by the first and second bucking saws 56 and 58, the logs are conveyed away from the bucking saws 56 and 58 by respective first bucking line outfeed conveyor 60 and second bucking line outfeed conveyor 62. The velocity of travel of the first and second logs is accelerated respectively by first bucking line log accelerator 64 and second bucking line log accelerator 66. The logs then reach respectively the first bucking line log sort conveyor 68 and the second bucking line log sort conveyor 70. Subsequently, the first and second logs are swept laterally by first bucking line sweep No. 1 and log catcher 72, and second bucking line sweep No. 1 and log catcher 74. As shown in FIG. 4, the log bucking area is set up with a pair of cut-off saws in each of the parallel log bucking lines, which thereby cuts the scanned logs into three separate segments. The components, according to the length of each cut segment, are sorted by first bucking line sweep No. 76 and second bucking line sweep No. 78 and first bucking line sweep No. 3 and second bucking line sweep No. 80, 82, as determined by the computer and according to the length of the segments that have been cut for each cut log, into three separate groups as indicated by the arrows.

Figure 5:
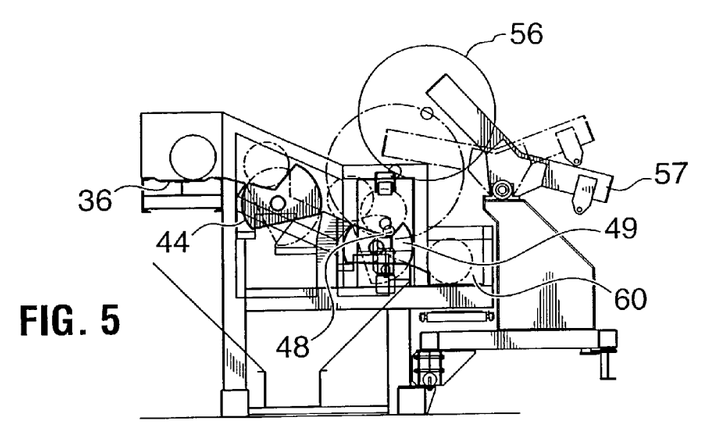
FIG. 5 is an end elevation of the cut-off saw and log bucking cradle.

FIG. 5 illustrates an end elevation of one of the cut-off saws with log cradle and outfeed conveyor. The cut-off saw 50 is shown in both an upper and lower position (the latter shown in dotted lines). The bucking saw 56 (cut-off saw) has a counterweight 57 to reduce energy consumption when the saw is raised and lowered.

As seen in end view in FIG. 5, the log (leftmost circle) enters the cut-off saw area on first bucking line conveyor 36. A sweep (not shown) then moves the log laterally to a notch in the first bucking line stop-loader 44. When stop-loader 44 is rotated to move the notch to the right (see dotted line) the log drops downwardly into first bucking line cradle 48. At that point, and to minimize travel time, the saw 56 has already been lowered in advance to an elevation slightly higher than the log diameter. This is determined by the computer from the log scan taken previously. When the log is held in the cradle 48, the saw 56 then cuts it at the optimum location as determined by the log scan. Once the log is cut, then the second stop 49 rotates to the right and permits the cut log to drop from the notch onto bucking line outfeed conveyor 60.

Figure 6A:
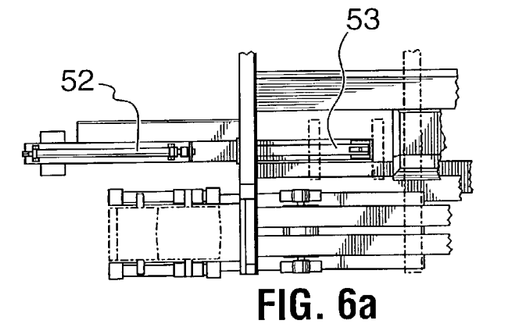
FIGS. 6a, 6b and 6c are plan, side and end elevations of the cut-off saw area log positioner.
Figure 6B:
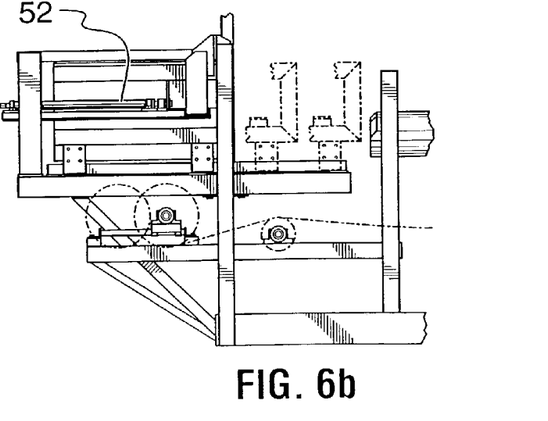
Figure 6C:
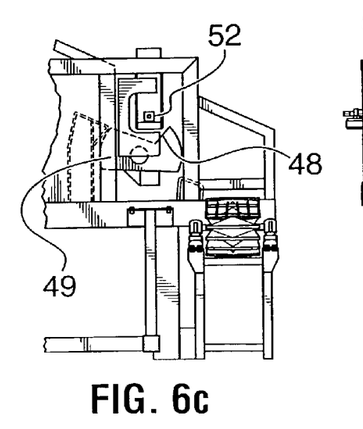

FIGS. 6a, 6b and 6c illustrate respectively plan, side and end elevations of the cut-off saw area log positioner. The position of piston 53, according to scan data received from the scanner, and analyzed by the computer, maximizes the location of the cut points on the debarked log lying in the cradle 48. The log positioner 52 extends the hydraulic piston 53 against the butt end of the log and moves it to an optimum log cutting location in the cradle 48 (see FIG. 5), as determined by the computer. FIG. 6(b) illustrates a side view of the log positioner 52 with the piston 53 retracted. FIG. 6(c) illustrates an end elevation of the log positioner 52.

The positioner 52 is innovative and unique. It enables the log lying in the cradle 48, in stop 49, to be moved to any optimum location as determined by the computer. It also enables the log to be positioned so that only the small end of the log is cut off and goes to hog. This is true whether the log is lying in the cradle head first or tail first. In this way, the more valuable butt log ends with greater diameter are not wasted. The log positioner 52, by being controlled by the computer, also enables the log to be positioned regardless of any central datum line. It is therefore not necessary to calculate log position according to a datum line. The computer, in combination with the log positioner 52, also controls the positions of the first and second cut-off saws 56 and 58, so that in combination, optimum lengths of log are cut, thereby minimizing wood loss due to log sweep, log crooks, and other deformities in the log.

Figure 7:
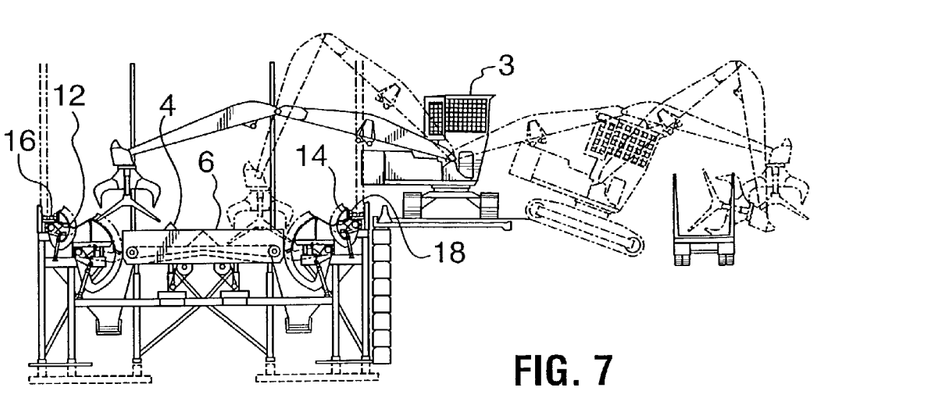
FIG. 7 is an end section view of the raw log collecting and dual quadrant area, taken along section line 1 of FIG. 1.

FIG. 7 is an end section view of the raw log collecting and dual quadrant area, taken along section line 1 of FIG. 1. As seen in FIG. 7, the pair of dual quadrant log singulators 12 and 14 are shown on each side of the log decks 4 and 6. The log grappler 3, as shown, drops raw logs on the respective first barker infeed deck 4 and the second barker infeed deck 6. After the logs have been singulated by the first dual quadrant singulator 12 and second dual quadrant singulator 14 respectively, they are moved to first barker infeed conveyor 16 and second barker infeed conveyor 18 respectively.

Figure 8:
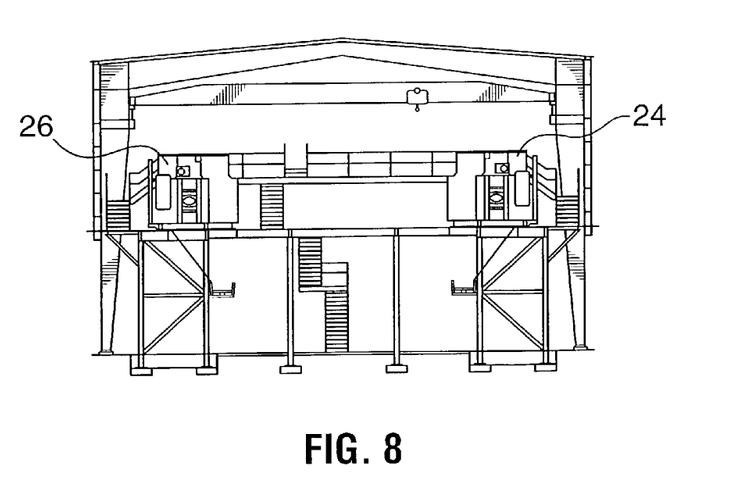
FIG. 8 is an end section view of the dual side by side log barkers, taken along section line 2 of FIG. 1.

FIG. 8 is an end section view of the dual side by side log debarkers, taken along section line 2 of FIG. 1. As seen in FIG. 8, the parallel positioned first debarker 24 and second debarker 26 are shown in side by side relation directly downstream from the conveyors 16 and 18 (see FIG. 7). The barking area operator cab 84, while not shown, is located immediately upstream of the pair of barkers 24 and 26 and enables the operator to view the entire log deck and singulating area.

Figure 9:
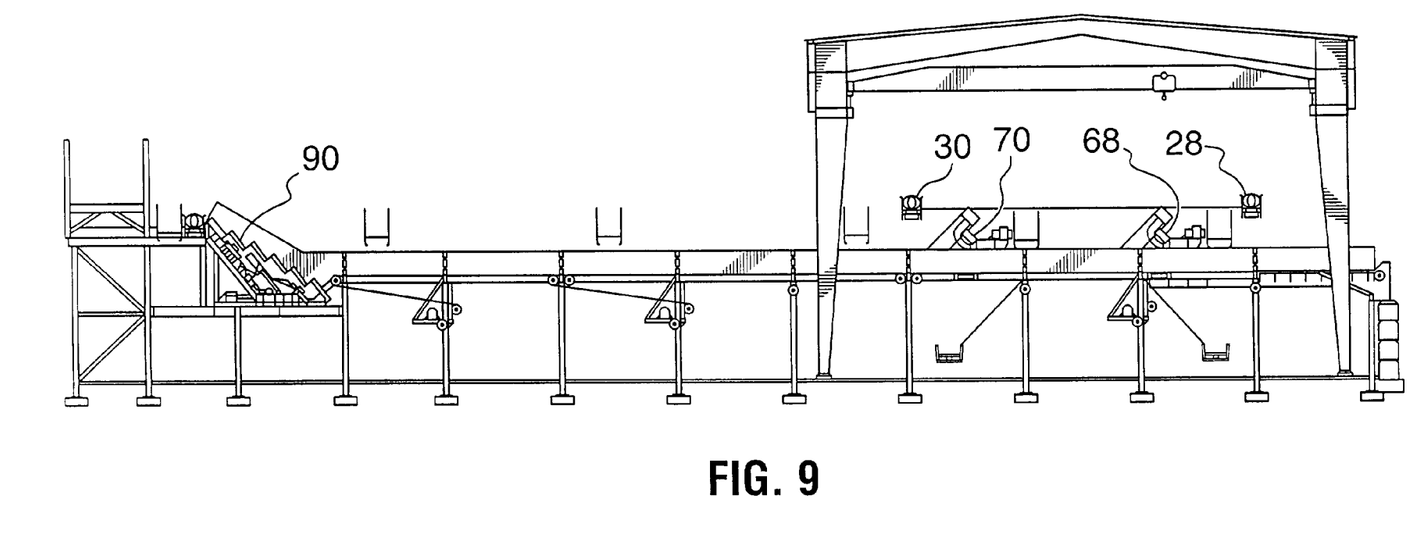
FIG. 9 is an end section view of the dual and cut log take away deck, taken along section line 3 of FIG. 1.

FIG. 9 is an end section view of the dual and cut log take away deck, taken along section line 3 of FIG. 1. As seen in FIG. 9, the first barker outfeed conveyor 28 and second barker outfeed conveyor 30 are shown in side by side relation. A pair of log sort conveyors 68 and 70 are also shown. While not shown in FIG. 9, the first, second and third group of bucking line sweeps 72, 76 and 80, and the second trio of second bucking line sweeps 74, 78 and 82 (see FIG. 1) move the cut logs laterally onto the sort deck and ultimately to a step feeder 90, which conveys the logs away to a sawmill, or some other suitable cut log handling facility.

Figure 10:
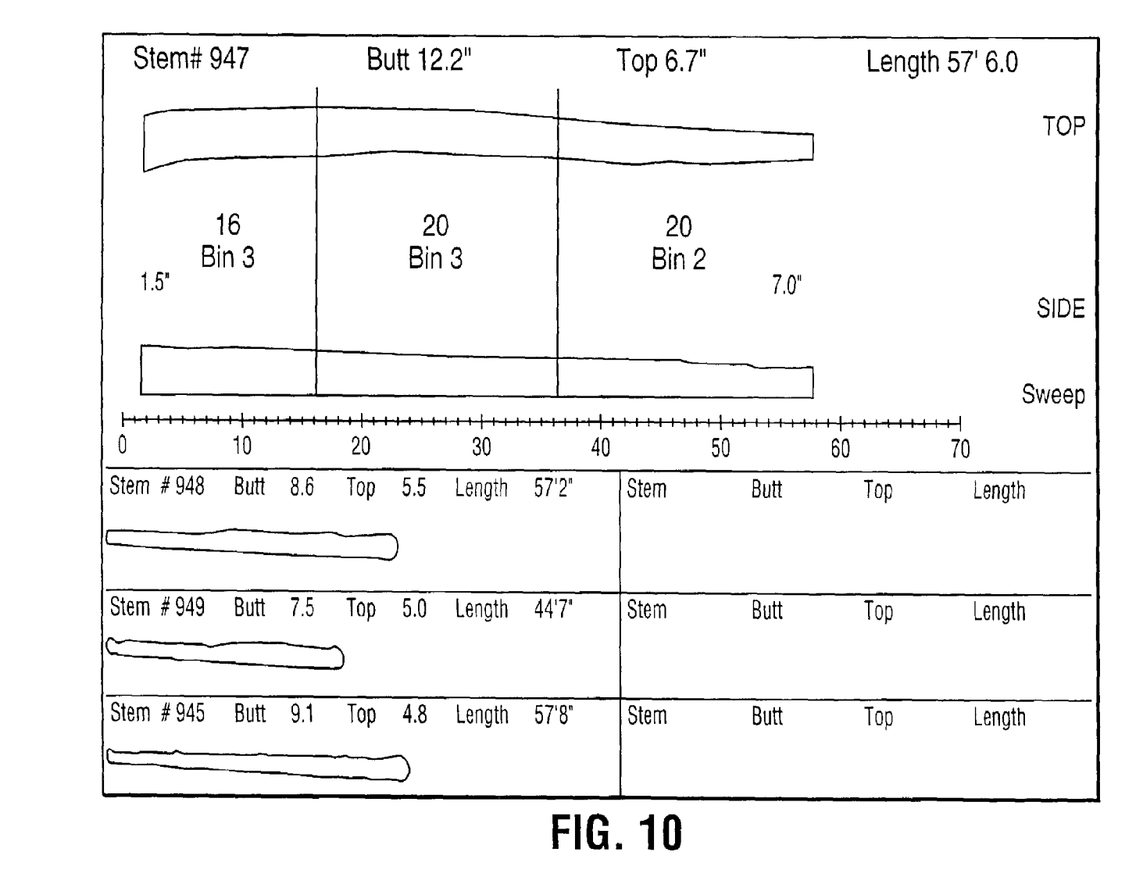
FIG. 10 is a schematic of the computer monitor display showing scanned log profile form the scanner.

FIG. 10 is a schematic of the computer monitor display showing scanned log profile form the scanner. As seen in FIG. 10, the scanned profiles of two parallel logs are shown in the upper portion of the screen. The locations of the two cuts on each log are also shown. The profiles of three log sections are shown in the lower portion of the screen.

Figure 11:
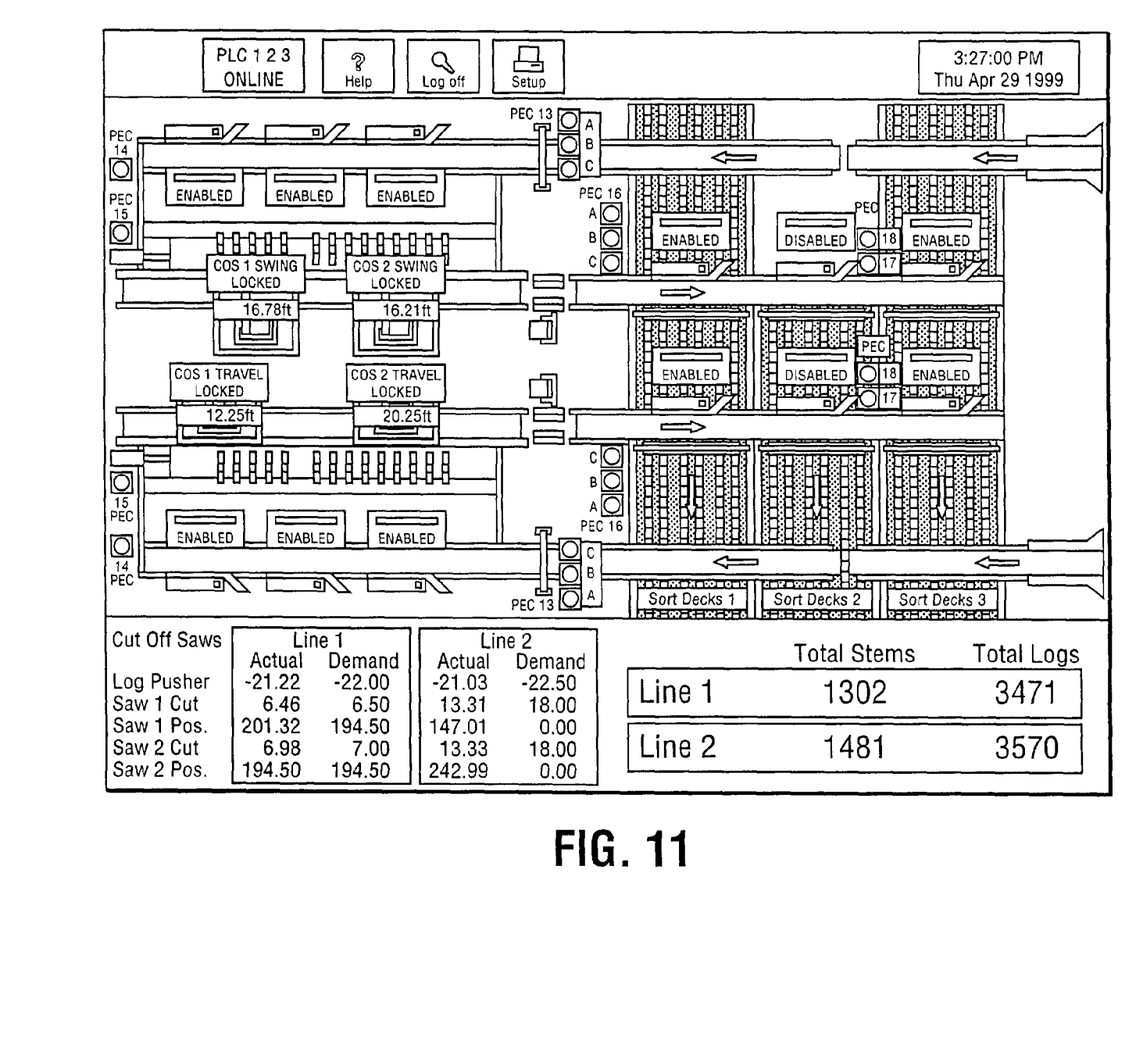
FIG. 11 is a schematic of the computer monitor display showing variables of the log bucking system.

FIG. 11 is a schematic of the computer monitor display showing variables of the log bucking system. FIG. 11 displays, among other things, the three sort decks, log pusher position (actual and demand) for each saw and total logs cut in line 1 and line 2 as of the time of the display.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A log processing system comprising:
    (a) a log feeder;
    (b) a first dual quadrant singulator located downstream of the log feeder;
    (c) a second dual quadrant singulator located downstream of the log feeder;
    (d) a first log barker located downstream of the first dual quadrant singulator
    (e) a second log barker located downstream of the second dual quadrant singulator; and
    (f) a first bucking line scanner located proximate the first log barker and adapted to scan a debarked log by means of an associated computer, for determining a log profile of the debarked log.

2. A system as claimed in claim 1 further comprising:
    (g) a second bucking line scanner located proximate the second log barker and adapted to scan a debarked log by means of an associated computer, for determining a log profile of the debarked log.

3. A system as claimed in claim 1 wherein the first log barker incorporates rotating rings, which hold debarking knives and a force exerted on the debarking knives and rotation speed of the rotating rings are varied according to log profile characteristics of an individual log.

4. A system as claimed in claim 1 wherein the first bucking line scanner determines the log profile by three laser scans, to determine the volume and shape of the log being scanned at incremental log lengths.

5. The log processing system of claim 1, wherein the first bucking line scanner is adapted to determine optimum cutting locations on a log.

\* \* \* \* \*